(12) United States Patent
Richard

(10) Patent No.: US 7,018,057 B2
(45) Date of Patent: Mar. 28, 2006

(54) TRANSPARENT PLASTIC OPTICAL COMPONENTS AND ABRASION RESISTANT POLYMER SUBSTRATES AND METHODS FOR MAKING THE SAME

(75) Inventor: David A. Richard, Shingles, CA (US)

(73) Assignee: VTEC Technologies, LLC, Chestnut Hill, MA (US)

( * ) Notice: Subject to any disclaimer, the term of this patent is extended or adjusted under 35 U.S.C. 154(b) by 69 days.

(21) Appl. No.: 10/633,972

(22) Filed: Aug. 4, 2003

(65) Prior Publication Data

US 2004/0027704 A1     Feb. 12, 2004

Related U.S. Application Data

(63) Continuation-in-part of application No. 10/177,614, filed on Jun. 24, 2002, now Pat. No. 6,601,960, which is a continuation-in-part of application No. 09/916,777, filed on Jul. 27, 2001, now Pat. No. 6,409,354.

(60) Provisional application No. 60/227,194, filed on Aug. 23, 2000.

(51) Int. Cl.
G02B 7/182     (2006.01)

(52) U.S. Cl. .................................... 359/883
(58) Field of Classification Search ............ None
See application file for complete search history.

(56) References Cited

U.S. PATENT DOCUMENTS

| | | |
|---|---|---|
| 3,879,625 A | 4/1975 | McVey et al. |
| 4,085,092 A | 4/1978 | Chang et al. |
| 4,193,668 A | 3/1980 | Skinner |
| 4,385,804 A | 5/1983 | Tamura et al. |
| 4,666,264 A | 5/1987 | Yamabe |
| 4,844,983 A | 7/1989 | Parker et al. |
| 4,944,581 A | 7/1990 | Ichikawa |
| 5,002,820 A | 3/1991 | Bolton et al. |
| 5,085,907 A | 2/1992 | Smith |
| 5,143,789 A | 9/1992 | Sanford et al. |
| 5,145,744 A | 9/1992 | Cartier et al. |
| 5,277,944 A | 1/1994 | Holzer et al. |
| 5,361,172 A | 11/1994 | Schissel et al. |
| 5,419,088 A * | 5/1995 | Raymond et al. ............ 52/1 |
| 5,443,912 A | 8/1995 | Olson |
| 5,445,871 A | 8/1995 | Murase et al. |
| 5,483,386 A | 1/1996 | Carson |

(Continued)

FOREIGN PATENT DOCUMENTS

DE     40 20 316 A1     9/1992

(Continued)

*Primary Examiner*—Euncha P. Cherry

(57) ABSTRACT

A polymer-based component formed from a synthetic thermoplastic or thermoset resin substrate, such as polymethyl methacrylate, which is resistant to warping and distortion from moisture. A composite multi-layer surface-hardening coating is formed on at least the anterior surface of the resin substrate. The component can include a composite multi-layer reflective coating to form a mirror. A protective back-coat layer is deposited on a posterior surface of the mirror. A multi-layer weather-resistant coating may optionally be applied to the anterior surface of the polymer-based mirror in order to increase the weatherability and durability of the mirror. The various layers coating the synthetic resin substrate have their moisture permeabilities selected so that substantially equal amounts of moisture permeate through to both the anterior and posterior side of the synthetic resin substrate. A sol-gel coating can be used to deposit the multi-layers in a single step by providing gradient zones of zirconia/silica while enabling a hydrophobic or a hydrophilic exterior surface.

26 Claims, 8 Drawing Sheets

U.S. PATENT DOCUMENTS

| | | |
|---|---|---|
| 5,506,051 A | 4/1996 | Levy-Borochov et al. |
| 5,506,057 A | 4/1996 | Olson |
| 5,540,978 A | 7/1996 | Schrenk |
| 5,552,927 A | 9/1996 | Wheatley et al. |
| 5,622,784 A | 4/1997 | Okaue et al. |
| 5,639,538 A | 6/1997 | Wong |
| 5,646,780 A | 7/1997 | Crook et al. |
| 5,648,149 A | 7/1997 | Rukavina et al. |
| 5,773,126 A | 6/1998 | Noritake et al. |
| 5,800,918 A | 9/1998 | Chartier |
| 5,840,429 A | 11/1998 | Rukavina et al. |
| 5,930,046 A | 7/1999 | Solberg et al. |
| 5,991,591 A | 11/1999 | Chen et al. |
| 6,017,609 A | 1/2000 | Akamatsu et al. |
| 6,159,618 A | 12/2000 | Danroc et al. |
| 6,178,034 B1 | 1/2001 | Allemand et al. |
| 6,180,224 B1 | 1/2001 | Shouji et al. |
| 6,207,236 B1 | 3/2001 | Araki et al. |
| 6,236,493 B1 | 5/2001 | Schmidt et al. |
| 6,256,147 B1 | 7/2001 | Davis |
| 6,737,105 B1 | 5/2004 | Richard |
| 2001/0031365 A1 | 10/2001 | Anderson et al. |
| 2003/0016458 A1 | 1/2003 | Richard |

FOREIGN PATENT DOCUMENTS

| | | |
|---|---|---|
| WO | WO 00/10934 | 2/2000 |
| WO | WO 00/55654 | 9/2000 |
| WO | WO 00/72053 | 11/2000 |
| WO | WO 00/78520 A1 * | 12/2000 |

* cited by examiner

TRANSPARENT PLASTIC OPTICAL COMPONENTS AND ABRASION RESISTANT POLYMER SUBSTRATES AND METHODS FOR MAKING THE SAME

RELATED APPLICATIONS

This application is a continuation-in-part of U.S. patent application Ser. No. 10/177,614, filed on Jun. 24, 2002, now issued as U.S. Pat. No. 6,601,960, which is a continuation-in-part of U.S. patent application Ser. No. 09/916,777, filed Jul. 27, 2001, now issued as U.S. Pat. No. 6,409,354, which is a conversion of U.S. Provisional Patent Application Ser. No. 60/227,194, filed Aug. 23, 2000.

BACKGROUND OF THE INVENTION

1. Field of the Invention

The present invention relates generally to coated plastic substrates such as polymer-based optical components including window panes and mirrors, and specifically to lightweight and durable synthetic resin optical components resistant to abrasion and war-page and methods for the manufacture thereof.

2. Description of Related Art

Coated plastic substrates and optical components are commonly used in various applications. The use of lightweight plastic substrates are frequently desirable but have presented problems for long-term use.

Mirrors typically have a multilaminate configuration. In particular, mirrors are typically formed by selectively depositing a series of compounds on a glass substrate material. These layers generally include a reflective layer and a protective back-coat layer covering-the reflective layer. The reflective layer is commonly formed from a thin film of aluminum, chromium, rhodium, or silver. In industrial applications, aluminum is typically used in place of silver due to its high reflectivity and low cost. The protective back-coat layer serves a multiplicity of functions, such as protecting the reflective layer from humidity. This function is required as the reflective layer, especially if it is formed from aluminum, is easily corroded by moisture. Since the substrate material upon which the reflective layer is deposited is often permeable to moisture, it is important that the protective back-coat layer be substantially impermeable to moisture in order to provide an effective encasement for the reflective layer. The back-coat layer also serves as a mechanical barrier to, for example, impact damage from airborne particulate matter. A properly configured and applied back-coat layer thus assists to provide a durable mirror.

Due to the high production costs related to glass mirrors, significant research has been undertaken to develop a durable, low-cost plastic mirror employing a synthetic resin substrate material. Furthermore, due to the shatter-proof nature of synthetic resin mirrors, their use is preferred in automobiles over conventional glass mirrors in order to improve the safety of the automobile. The primary focus of this research has been in connection with dynamically stable and substantially optically clear thermoplastic or thermoset resins, such as polymethyl methacrylate (PMMA). As a result of these efforts, a method for sequentially depositing an aluminum reflective material and an impermeable back-coat layer on a resin substrate material has been developed.

The main problem associated with synthetic resin mirrors is their significantly limited operational service life resulting from warpage or distortion of the mirrors due to the hygroscopic properties of thermoplastics or thermoset resins. Unlike their glass counterparts, mirrors formed with a thermoplastic or a thermoset resin as their substrate material gradually absorb moisture from the surrounding atmosphere. Over time, the moisture so absorbed corrodes the reflective layer. Further, the absorption of moisture, coupled with variations in other climatic conditions, causes the thermoplastic or thermoset resin to expand and contract. Compounding these problems is the fact that the back-coat layer is, typically, not affected by humidity or other climatic conditions. The back-coat layer thus acts to prevent the smooth linear expansion and contraction of the thermoplastic or thermoset resin substrate. Furthermore, the moisture permeability of the various coatings applied to both sides of the synthetic resin substrate often lead to different amounts of moisture being absorbed by the opposing surfaces of the synthetic resin substrate, thus resulting in uneven expansion and contraction on both sides of the substrate. These conditions all interact to produce distortion to the image produced by the reflective layer of the plastic mirror and a related loss of optical clarity. As the mirror ages, this degradation only becomes more acute.

In order to reduce the susceptibility of synthetic resins to hygroscopic effects, it has been proposed that a hardening material be applied to the thermoplastic or thermoset resin substrate before deposition of the reflective layer. Currently organosilicon polymers are the preferred hardening material. These polymers are preferred due to their ability to provide protection against impact damage and their high optical clarity when fully cured. Although organosilicon polymers are the best available material for this purpose, these polymers are not totally impermeable to water. Thus, although partially effective, these polymers do not provide a complete remedy to all of those issues related to the use of a thermoplastic or thermoset resin substrate material in connection with a mirror apparatus.

A need exists for a mirror apparatus and other optical components that do not suffer from the foregoing disadvantages and limitations. In particular, a need exists for a mirror apparatus formed using a thermoplastic or thermoset resin substrate that will remain substantially unaffected by ambient environmental conditions.

SUMMARY OF THE INVENTION

The foregoing shortcomings and disadvantages of the prior art are alleviated by the present invention that provides a polymer-based optical component that is resistant to abrasion and mechanical distortion resulting from climatic and hydrodynamic conditions, such as a polymer-based mirror which includes a substrate or transparent element formed from a synthetic thermoplastic or thermoset resin, such as polymethyl methacrylate or the like. The resin substrate has an anterior surface and a posterior surface. In certain embodiments, a tie-bond layer is typically applied to all of the exposed surfaces of the resin substrate.

Following deposition of the tie-bond layer, a surface-hardening layer is coated on at least the anterior surface of the resin substrate. This layer may consist of one or more layers of various materials which form a surface-hardening layer substantially impermeable to water. A surface-hardening layer formed of the following layers has been found to provide a desired level of moisture permeability for the anterior surface of the synthetic resin substrate: 500 to 1200 angstroms of SiO, preferably 750 angstrom; 300 to 1200 angstroms of $SiO_2$, preferably 550 angstrom; and, 600 to 1400 angstroms of $Z_x(iPv)_2$, preferably 725 angstrom. A surface-hardening layer may also be applied to the posterior surface of the synthetic resin substrate, where the posterior surface-hardening layer preferably comprises 300 to 1200 angstroms of $SiO_2$, preferably 550 angstrom; and, 600 to 1400 angstroms of $Z_x(iPv)_2$ preferably 725 angstrom.

A reflective layer of a composition substantially resistant to moisture is deposited on the posterior side of the resin element. The reflective layer comprises a series of materials sequentially deposited onto the posterior surface of the treated resin substrate. A reflective layer formed from the following layers exhibits the desired reflectance, moisture permeability, and durability for the polymer-based mirror of the present invention: 500 to 1200 angstroms of SiO, preferably 750 angstroms; 700 to 1500 angstroms of aluminum, preferably 1200 angstroms; 500 to 1200 angstroms of SiO, preferably 750 angstroms; 600 to 1400 angstroms of $Z_x(iPv)_2$, preferably 725 angstroms; and 300 to 1200 angstroms of $SiO_2$, preferably 550 angstroms. The reflective layer of the invention is preferably formed on the synthetic resin substrate via a vacuum deposition technique. A protective back-coat layer is then deposited over the reflective layer to encase the outer surface of the reflective film layer. When the surface-hardening layer is also applied to the posterior surface of the resin substrate, the back-coat layer can also encase the surface-hardening layer as well as the reflective layer. A weather-resistant coating is further applied to the anterior surface of the polymer-based mirror in order to increase the weatherability and durability of the mirror.

Overall, the polymer-based mirror of the present invention has a multilaminate configuration including sequentially deposited layers of organic and inorganic materials. The polymer-based mirror of the present invention exhibits superior moisture resistance as compared to conventional aluminum, chromium, and rhodium coated mirrors. The present invention further provides a mirror that is easily and economically produced.

Another embodiment of the present invention provides an improved resin substrate component such as a mirror or window for the automotive industry or any application of a resin substrate component with superior abrasion resistant properties that can be made in an economical manner. A gradient coating of a zirconia/silica colloid particles can be provided directly on a synthetic resin substrate by a sol gel method of coating the substrate and permitting a controlled orientation and migration of the zirconia/silica colloid particles within a polysiloxane carrier before curing. As a result, the resin substrate is provided with layers or gradient zones having varying amounts of zirconia/silica colloid particles. In one embodiment, the exterior surface of the final product will have a high concentration of zirconia/silica particles to provide an abrasion resistant and moisture stable product that can accommodate thermal expansion cycles during normal use. The present invention further includes the method of making such a product.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a coated resin substrate and method of making.

The present invention is directed to a coated resin substrate such as optical components including polymer-based mirrors which may possess any variety of configurations. For example, as discussed with regard to the several FIGURES, the polymer-based mirror of the present invention can have a wedge-like, curved, toric, planar, or other configuration. The polymer-based mirror can be utilized as an interior or exterior rearview mirror for an automobile. However, it is understood that the polymer-based mirror of the present invention is not limited to automotive usage and may be utilized for other mirror applications as well.

The polymer-based mirror of the invention is comparable to a glass mirror in quality and appearance, but is advantageous over glass due to its lightweight and durable design. The polymer-based mirror of the present invention has been designed so as to not exhibit significant moisture absorption. As a result, the polymer-based mirror of the present invention does not exhibit noticeable warping or other mechanical distortion. In varied climatic conditions, the polymer-based mirror of the invention remains dynamically stable. The mirror of the invention is also very durable. The surface-hardening layers noted below impart significant resistance to mechanical damage from, for example, airborne particles. As a result, the mirror of the invention exhibits sufficient stability so as to comply with automobile industry test standards related to, for example, internally and externally mounted rearview mirrors.

Figure 1:
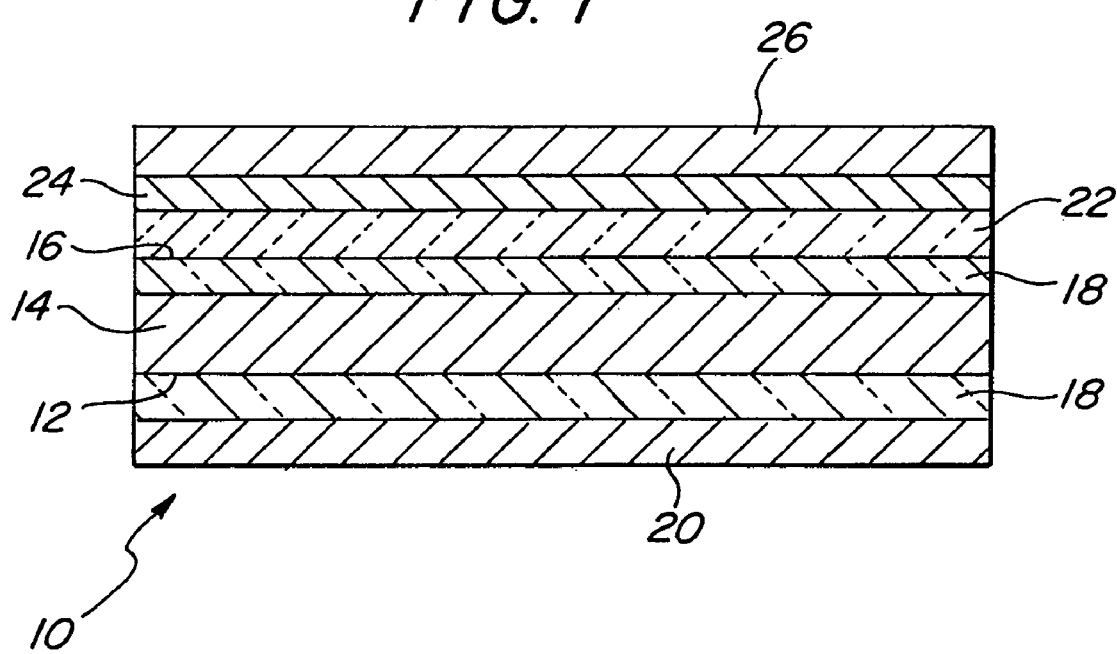
FIG. 1 is a cross-sectional view of a preferred embodiment of the polymer-based mirror of the present invention.

Referring now to FIG. 1, a cross-sectional view of a preferred embodiment of the polymer-based mirror 10 designed as an inside rearview mirror for a vehicle is illustrated. A transparent mirror body 14 is typically made of a synthetic resin substrate high in optical clarity, such as a thermoplastic or thermoset resin. A preferable synthetic resin is polymethyl methacrylate (PMMA) resin, while it is understood that other similar polymers may also be utilized in forming the synthetic resin substrate 14, such as polycarbonate (bisphenol-A), cyclic olefins, styrene, acrylic/styrene, CR-39® manufactured by PPG Industries, acetate, polyvinyl butyrate, or polyurethane. This synthetic resin substrate 14 can readily be shaped by an injection or compression molding process.

The PMMA resin substrate 14 is preferably formed by polymerizing methyl methacrylate, where virtually all of the methyl methacrylate reacts during the polymerization reaction to form PMMA. Some unreacted monomers do remain on a front surface 12 and a rear surface 16 of the resin substrate 14 as well as within the core of the resin substrate 14. Those monomers within the resin substrate 14 typically blush to the closest of either the front surface 12 or rear surface 16 following the molding process. In order to eliminate any detrimental effects which these monomers may cause, all of the exposed surfaces of the resin substrate 14 are treated with a thin and transparent surface preparation in the form of an organic silicon material. This action renders the resin substrate 14 virtually chemically inert.

This organic silicon material is sprayed, dipped, or centrifugally coated onto the resin substrate 14 to form a tie-bond layer 18 on the front surface 12 and the rear surface 16 of the resin substrate 14. The tie-bond layer 18 is preferably an organosilicon polymer with a thickness of between about 3 and about 10 microns. The tie-bond layer 18 also serves to provide the substrate with a sufficient degree of scratch resistively. A typical organosilicone is one prepared from triethoxymethyl silane $CH_3Si(OC_2H_5)_3$. The tie-bond layer 18 is, generally, permeable to humidity, for example, the rate of moisture absorption through the organosilicon silane is about 3 g/m² per 24 hours when tested in an atmosphere maintained at 50° C. with 98% room humidity. Thus, the tie-bond layer 18 requires an additional coating to reduce this permeability.

Following application of the tie-bond layer 18, the front (anterior) surface 12 of the resin substrate 14 is coated with a surface-hardening layer 20. The surface-hardening layer 20 may consist of one or more layers of various materials which form a surface-hardening layer substantially impermeable to water. A surface-hardening layer 20 formed of the following layers has been found to provide a desired level of hardness and moisture permeability for the synthetic resin substrate: 500 to 1200 angstroms of SiO, preferably 750 angstrom; 300 to 1200 angstroms of $SiO_2$ preferably 550 angstrom; and, 600 to 1400 angstroms of $Z_v(iPv)_2$, preferably 725 angstrom. If desired, the rear (posterior) surface 16 can also be coated with a surface-hardening layer 22 without detracting from the performance of a subsequent reflective layer 24 and protective back-coat layer 26 applied to the posterior surface 16. A surface hardening layer 22 formed of the following layers has been found to provide a desired level of hardness and moisture permeability for the synthetic resin substrate: 300 to 1200 angstroms of $SiO_2$, preferably 550 angstrom; and, 600 to 1400 angstroms of $Z_v(iPv)_2$ preferably 725 angstrom.

To provide a mirror surface, the posterior surface 16, or posterior surface-hardening layer 22 (if applied), of the resin substrate body 14 is further coated with a thin composite reflective layer 24. The reflective layer 24 is applied using vacuum deposition techniques. The reflective layer 24 is formed by sequentially depositing a series of organic and inorganic material~. A reflective layer 24 having the following sequential layers has been found to provide the desired moisture permeability, level of reflectivity, durability, and resistance to corrosion: 500 to 1200 angstroms of SiO, preferably 750 angstrom; 700 to 1500 angstroms of aluminum, preferably 1200 angstrom; 500 to 1200 angstroms of SiO, preferably 750 angstrom; 600 to 1400 angstroms of $Z_v(iPv)_2$, preferably 725 angstrom; and, 300 to 1200 angstroms of $SiO_2$, preferably 550 angstrom. The reflective layer 24 having this construction has been found to provide good reflectivity an excellent resistance to erosion from the influence of moisture. Furthermore, this alloy/for the reflective layer 24 is superior to the reflectivity of a standard aluminum thin film reflective coatings. The reflective layer 24 possesses a luminous transmission of approximately 94.5%.

As a mechanical protection for the thin reflective layer 24, a protective back-coat layer 26 is formed so as to closely cover the entire area of the outer major surface of the reflective layer 24. Various known materials and coating methods can be used to form, and apply, the back-coat layer 26. For example, a back-coat layer 26 of excellent properties can be obtained by applying a resin based paint containing a relatively large amount of a powered inorganic filler material such as calcium carbonate, barium carbonate and/or aluminum silicate. As a particular example of this type of coating method, it is possible to form a back-coat layer 26 sufficiently high in physical strength and appropriate in reduced humidity permeability by the application of a paint which comprises an alkyd resin binder and a calcium carbonate powder (between about 1 to about 5 microns in particle size) amounting to 75 to 80% by weight of the alkyd resin so as to afford a thickness of between about 10 to about 20 microns to the resultant back-coat layer 26. The presence of the back-coat layer 26 further eliminates the need to include the SiO layer, which is present in the anterior surface-hardening layer 20, in the posterior surface-hardening layer 22. As a primary feature of the invention, the permeability of the back-coat layer 26 to moisture is selected to operate in conjunction with the moisture permeability of the underlying layers, i.e., reflective layer 24 and posterior surface-hardening layer 22, and the anterior surface-hardening layer 20 so as to ensure that substantially equal amounts of moisture permeate through to both the anterior surface 12 and the posterior surface 16 of the resin substrate 14.

Figure 2:
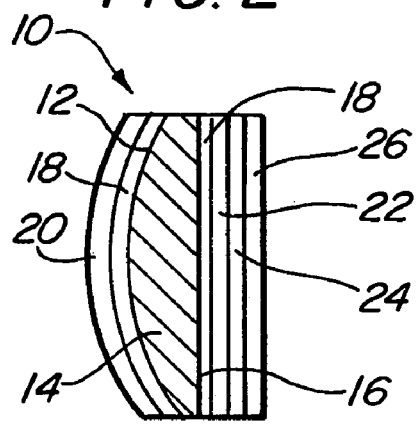
FIG. 2 is a cross-sectional view of another preferred embodiment of the polymer based mirror of the present invention.
Figure 3:
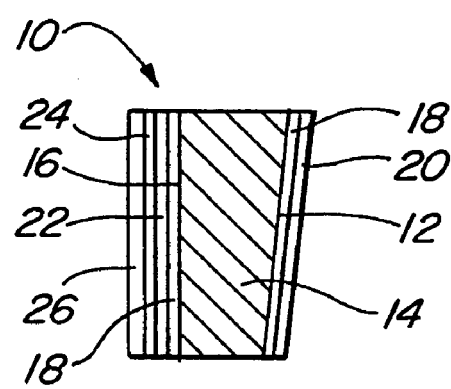
FIG. 3 is a cross-sectional view of yet another preferred embodiment of the polymer-based mirror of the present invention.

The polymer-based mirror illustrated in FIG. 1 has a generally laterally elongated rectangular shape as well as generally rectangular cross-sectional shape. In other preferred embodiments of the present invention, the resin body 14 may be formed as other than rectangular. For example, as shown in FIG. 2, a polymer-based mirror 200 having a planoconvex resin substrate 202 is shown. In FIG. 3, a polymer-based mirror 300 having wedge shaped resin substrate 302 is shown, where the anterior surface 12 and the posterior surface 16 are not parallel to each other. The resin substrate 302 is so shaped as to be wedge-like in cross-section in order to avoid glare from the mirror 300 during night running of a vehicle employing the mirror 300. In FIGS. 2 and 3, like reference numbers refer to like elements described in connection with FIG. 1 and further discussion of these like elements will be omitted. It is also possible for the polymer-based mirror to have other shapes and configurations, including but not limited to toric, bi-convex, plano-concave, and bi-concave.

From a practical viewpoint, the polymer-based mirror of the present invention is comparable to a conventional mirror created by a glass plate coated with an aluminum film owing to the high transparency of the optically clear thermoplastic or thermoset resin substrate 14 and good reflectivity of the reflective SiO—Al—SiO-$Z_v(iPv)_2$, $SiO_2$ reflective layer 24. Moreover, the polymer-based mirror 10 is advantageous in its lightweight nature and durability of the resin substrate 14. Furthermore, the possibility of shaping the cross-sectional resin substrate 14 by a simple injection or compression molding without the need of any machining operations leads to reduction of the total cost of production compared with the production conventional glass mirror of the same shape.

As one of the most remarkable effects of the invention, the polymer-based mirror 10 of the present invention 10 is quite stable and can withstand extended use in either dry or humid atmospheres. The polymer-based mirror 10 has an anterior treated surface and a posterior treated surface that exhibit substantially equivalent reduced moisture permeability to prevent warpage or distortion of the mirror 10. The reason for the substantially equivalent reduced moisture permeability is that the composition and thicknesses of the anterior surface hardening layer 20, posterior surface-hardening layer 22, reflective layer 24, and back-coat layer 26 are selected to have a moisture permeability providing the anterior surface 12 of the resin substrate 14 with substantially the same exposure to moisture as the posterior surface 16. The resin substrate 14 absorbs low levels of moisture from its anterior surface 12 and undergoes only slight swelling in the region contiguous to the anterior surface 12 as a result. At the same time, the same atmospheric moisture condition is applying itself to the posterior surface 16 of the resin substrate 14. The moisture permeability conditions of the posterior surface-hardening layer 22, reflective layer 24, and back-coat layer 26 are selected such that the resin substrate 14 absorbs the same minimum levels of moisture from the posterior surface 16 as its anterior surface 12 and tends to undergo only slight swelling on the posterior side of the resin substrate 14 as well. For this reason, even when the resin substrate 14 swells by absorption of moisture, the swelling occurs on both anterior surface 12 and posterior surface 16 in an almost balanced manner. Therefore, the swelling of the resin substrate 14 does not result in distortion of the optical surface figure of the mirror to a degree that it degrades the optical performance of the mirror 10.

Experiments on the polymer-based mirror 10 formed in accordance with the present invention were performed to determine the advantageous characteristics and effects of the thin film formula ranges described within the invention on mirror reflectivity performance. In these experiments, the surface-hardening layers 20 and 22 and the organosilicon silane tie-bond layer 18 were not altered, where the composition of the reflective layer 24 was altered to illustrate its effect on reflectivity of the mirror 10.

Experiment Number One

Six (6) sample mirrors of the present invention were subjected to the test. All samples were subjected to film deposition. The reflective coating 24 deposited was: 500 Angstrom of SiO, 700 Angstrom of Al, 500 Angstrom of SiO, 600 Angstrom of $Z_v(iPv)_2$, and 300 Angstrom of $SiO_2$. An adequate background of $O_2$ gas was introduced for reaction of the coating media. Evaporation was performed at $5\times10^{-5}$ TORR. This pressure has been found to allow reactive evaporation and is low enough to produce dense coatings. Upon completion of the coating process, the mirrors were subjected to reflectivity testing and aesthetic observation. The outcome of the reflectivity test was:

| Wavelength | % Reflectivity | Color |
|---|---|---|
| 750 | 94.993 | dark blue |
| 700 | 94.948 | dark blue |
| 650 | 71.360 | dark blue |
| 600 | 63.169 | dark blue |
| 550 | 72.609 | dark blue |
| 500 | 87.223 | dark blue |
| 450 | 92.197 | dark blue |
| 400 | 64.793 | dark blue |
| 380 | 4.292 | dark blue |
| 300 | 2.089 | dark blue |

Figure 4:
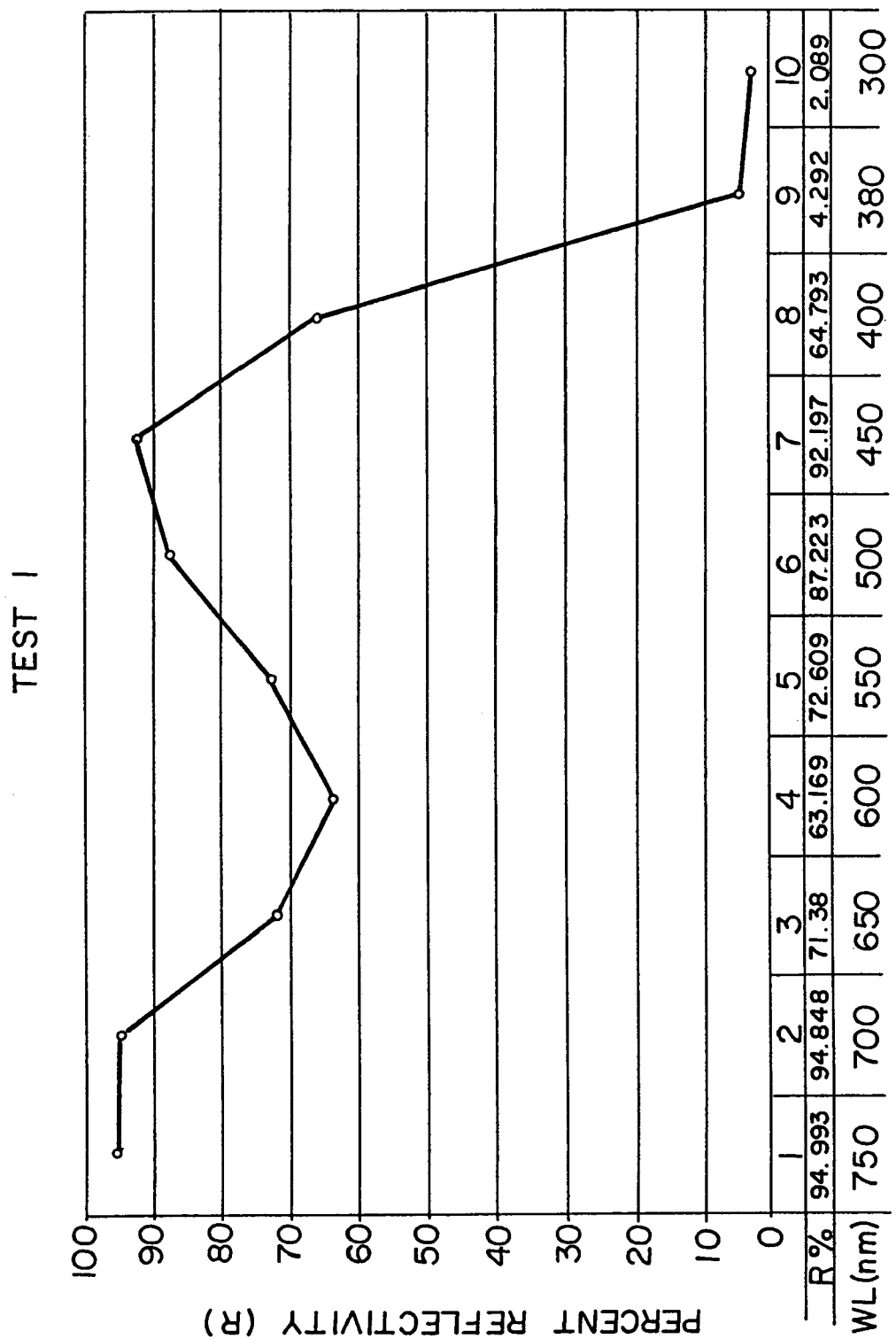
FIG. 4 is a graphical representation of the results of a reflectivity test of six mirrors made in accordance with the present invention having a first coating.

A graphical representation of the results of the foregoing reflectivity test is shown in FIG. 4.

Experiment Number Two

Six (6) sample mirrors of the present invention were subjected to the test. All samples were subjected to film deposition. The reflective coating 24 deposited was: 750 Angstrom of SiO, 1200 Angstrom of Al, 750 Angstrom of SiO, 725 angstrom of $Z_v(iPv)_2$, and 500 Angstrom of $SiO_2$. An adequate background of $O_2$ gas was introduced for reaction of the coating media, Evaporation was performed at $5\times10^{-5}$ TORR. This pressure has been found to allow reactive evaporation and is low enough to produce dense coatings. Upon completion of the coating process, the mirrors were subjected to reflectivity testing and aesthetic observation. The outcome of the reflectivity test was:

| Wavelength | % Reflectivity | Color |
|---|---|---|
| 750 | 95.220 | silver |
| 700 | 95.131 | silver |
| 650 | 95.133 | silver |
| 600 | 94.959 | silver |
| 550 | 94.339 | silver |
| 500 | 95.220 | silver |
| 450 | 95.025 | silver |
| 400 | 95.503 | silver |
| 380 | 5.146 | silver |
| 300 | 4.399 | silver |

Figure 5:
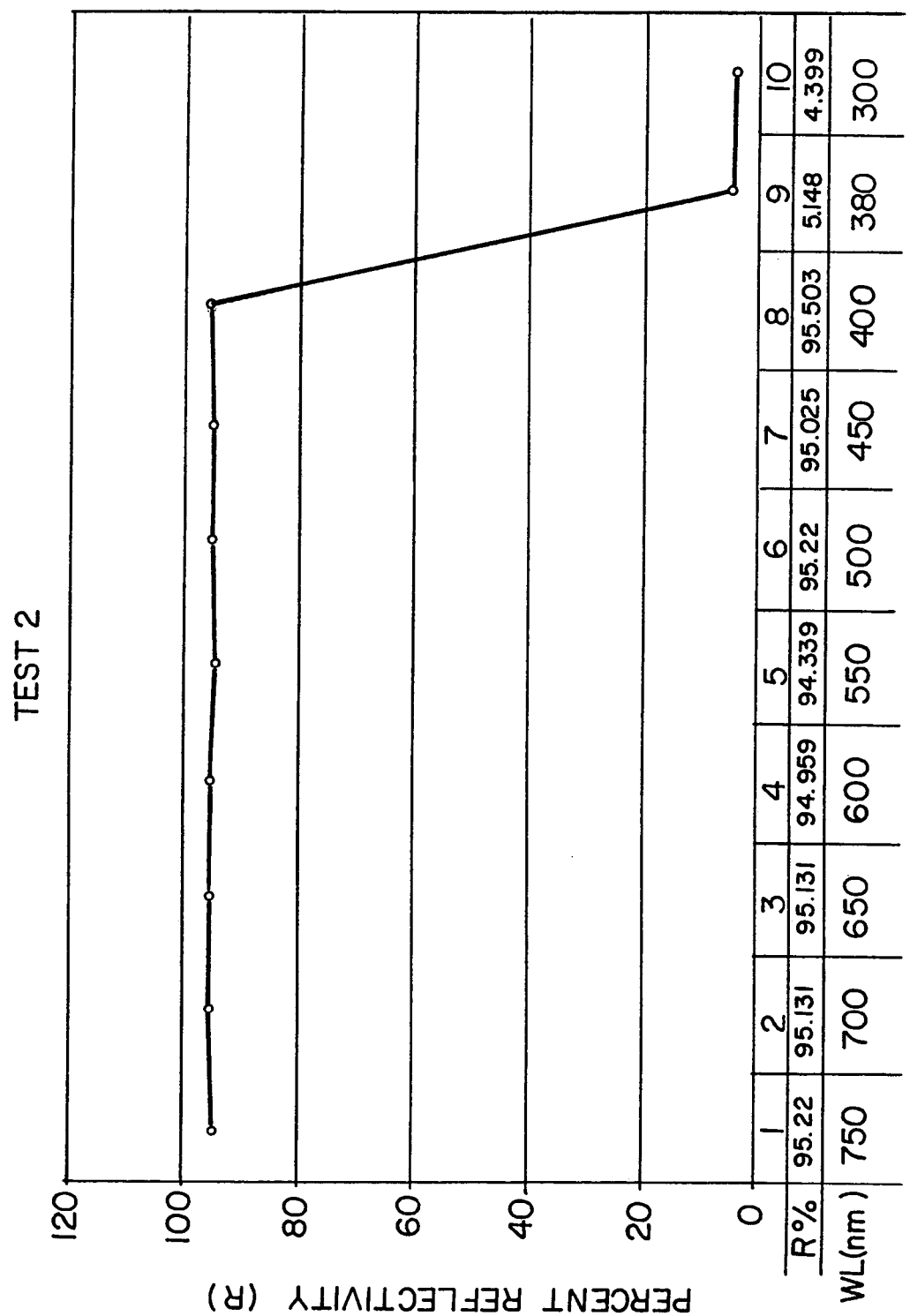
FIG. 5 is a graphical representation of the results of a reflectivity test of six mirrors made in accordance with the present invention having a second coating.

A graphical representation of the results of the foregoing reflectivity test is shown in FIG. 5.

Experiment Number Three

Six (6) sample mirrors of the present invention were subjected to the test. All samples were subjected to film deposition. The reflective coating 24 deposited was: The coating description was: 1200 Angstrom of SiO, 1500 Angstrom of Al, 1200 Angstrom of SiO, 1400 Angstrom of $Z_v(iPv)_2$, and 1200 Angstrom of $SiO_2$. An adequate background of $O_2$ gas was introduced for reaction of the coating media. Evaporation was performed at $5\times10^{-5}$ TORR. This pressure has been found to allow reactive evaporation and is low enough to produce dense coatings. Upon completion of the coating process, the mirrors were subjected to reflectivity testing and aesthetic observation. The outcome of the reflectivity test was:

| Wavelength | % Reflectivity | Color |
| --- | --- | --- |
| 750 | 95.306 | gold |
| 700 | 95.054 | gold |
| 650 | 95.259 | gold |
| 600 | 94.998 | gold |
| 550 | 95.434 | gold |
| 500 | 95.139 | gold |
| 450 | 95.139 | gold |
| 400 | 94.653 | gold |
| 380 | 12.153 | gold |
| 300 | 7.589 | gold |

Figure 6:
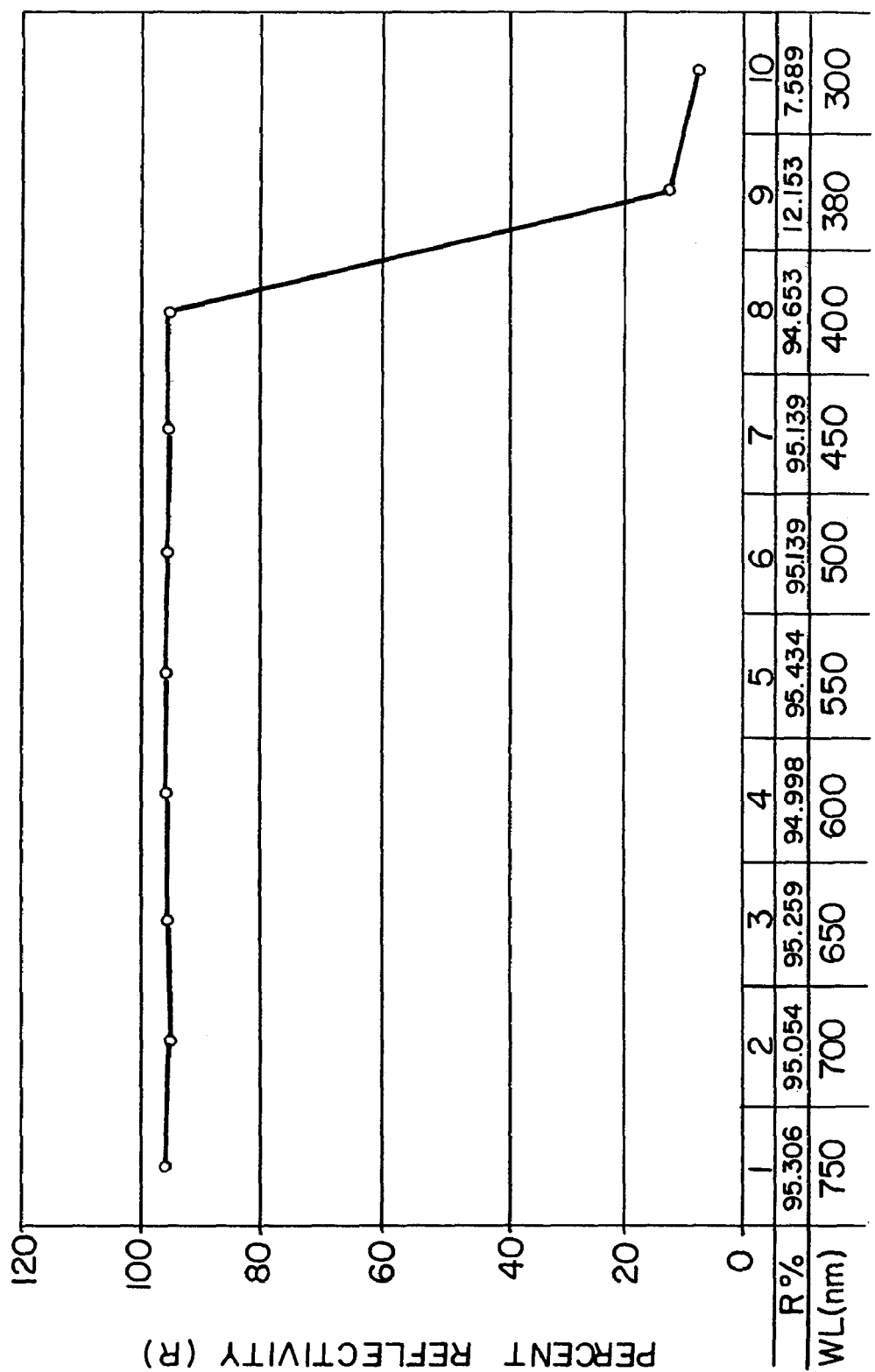
FIG. 6 is a graphical representation of the results of a reflectivity test of six mirrors made in accordance with the present invention having a third coating.

A graphical representation of the results of the foregoing reflectivity test is shown in FIG. 6.

Experiment Number Four

An experiment was carried out to determine the resistance and stability of the polymer-based mirror formed in accordance with the present invention when exposed to a high moisture and salt environment according to the ASTM B117-95 standard. Each reflective film was fabricated according to the description presented. There were three (3) mirrors subjected to the test. Two (2) of the mirrors of the present invention samples were of an aspheric anterior surface figure and one (1) was of a plano anterior surface figure. All three samples of the invention were subjected to a concentrated salt solution of 5+/−1% water with sodium chloride. The specific gravity of the condensate was 1.036. The pH of the condensate was 6.8. The volume of the concentrate was 1.3 ml/hr/80 cm². The test chamber temperature was 35+/−1° C. The invention specimens were positioned at an incline to the spray of 15° from the vertical. All invention samples were exposed to the test for 96 hours of continuous spray. None of the samples of the invention were subjected to any pre-cleaning. After the conclusion of the test, the sample mirrors were water rinsed and air-dried. Observations at the conclusion of the test were that there were no visual or mechanical defects on any of the three (3) sample mirrors. Additionally, an examination of the reflectivity concluded that there had been no deterioration of the pre-test reflectivity results. Additionally, examination of the optical imagery of the sample mirrors showed no post-test distortion.

The mirror of the invention also includes modification of the anterior surface geometry so as to both increase the viewing angle of the device and allow for the correction of image aberrations. By incorporating aspheric formulae such as:

$$z(x) = \frac{cx^2}{1 + \sqrt{1 - c^2(k+1)x^2}} + a_1 x^4 + a_2 x^6 + a_3 x^8 + a_4^{10}$$

where:

c, k, $a_n$=spherical, conic, and aspheric coefficients x=distance (radius) from the center of the lens z=depth or as NERBS in a CAD/CAM design the mirror of the invention can be given an anterior configuration configured to correct magnification errors and distortions typically observed in glass interior and exterior rearview mirrors.

Figure 7:
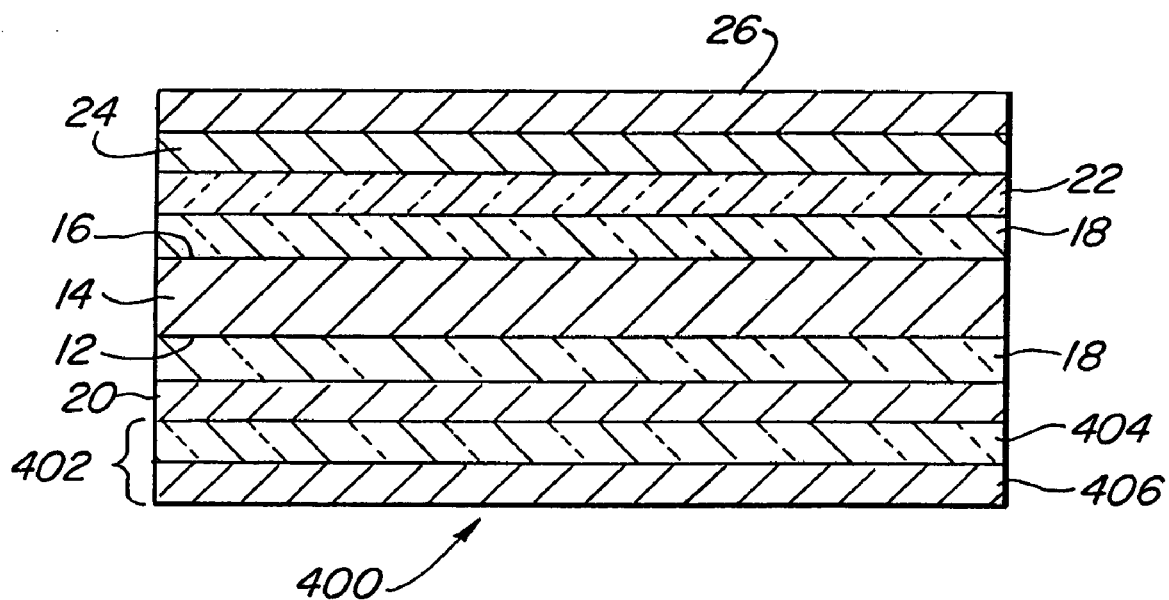
FIG. 7 is a cross-sectional view of another preferred embodiment of the polymer based mirror of the present invention.

Referring now to FIG. 7, a cross-sectional view of a polymer-based mirror 400 formed in accordance with another preferred embodiment of the present invention is illustrated in which the polymer-based mirror 10 described in FIG. 1 further includes a weather-resistant coating 402 on the anterior side of the mirror 400. The elements of FIG. 7 which are similarly numbered as those elements in FIG. 1 are equivalent, and a further description of these elements already described in connection with FIG. 1 will be omitted from the description of the polymer-based mirror 400 of FIG. 7. The elements of the polymer-based mirror 400 which are similarly numbered as those elements are The weather-resistant coating 402 includes a hydrophilic stack of layers 404 having its outer surface covered with a hydrophobic layer 406, where the hydrophilic stack 404 is formed over the anterior surface-hardening layer 20. The hydrophilic stack 404 preferably comprises alternating layers of zirconia ($ZrO_2$) and silicon dioxide, where a stack 404 of the following construction has been found by the inventors to provide optimal levels of reflectivity and transmission while maintaining an absence of color in the stack 404: 2616 angstrom of $SiO_2$, 246 angstrom of $ZrO_2$, 174 angstrom of $SiO_2$, 765 angstrom of $ZrO_2$, 907 angstrom of $SiO_2$. The hydrophobic layer 406 is preferably a hydrophobic acting perfluoroalkylsilane which forms a strongly adherent fluorised siloxane coating on the outer surface of the hydrophilic stack 404. The optimal coating thickness for the perfluoroalkylsilane layer 406 is approximately 5–20 nm.

By utilizing alternating layers of $SiO_2$ and $ZrO_2$ in the hydrophilic stack 404 in combination with the hydrophobic perfluoroalkylsilane layer 406, a weather-resistant coating 402 is provided which increases the weatherability and durability of the mirror 400 by affording a more weather resistant barrier to water infusion. The layers of the hydrophilic stack 404 and the hydrophobic layer 406 are both dry coatings which are vacuum coated onto the surface of the anterior surface-hardening layer 20. Furthermore, the compositions of the hydrophilic stack 404 and the hydrophobic layer 406 are selected to have matching thermal coefficients of expansion, so that the various layers within the weather-resistant coating 402 expand and contract in a substantially uniform manner under all conditions to which the mirror 400 is exposed. The thermal coefficient of expansion of the weather-resistant coating 402 is further matched against the other layers of the polymer-based mirror 400, so that all of the various layers expand and contract in a substantially uniform manner. By matching the thermal coefficients of expansion of the various layers, the bonds formed between the layers will also be maintained in a more secure manner to prevent the leakage of moisture there through. The above-described stack composition of the weather-resistant coating 402 has been found to provide the optimal balance between warpage, reflectivity, and weatherability of the polymer-based mirror 400.

Figure 8:
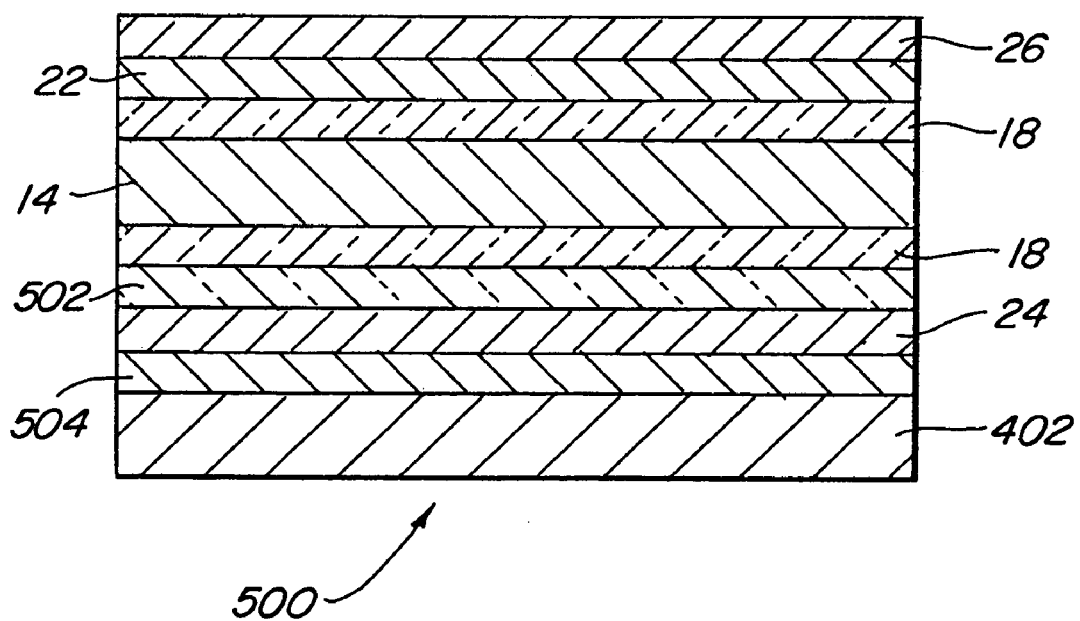
FIG. 8 is a cross-sectional view of another preferred embodiment of the polymer based mirror of the present invention.

Referring now to FIG. 8, a cross-sectional view of a polymer-based mirror 500 formed in accordance with an alternative embodiment of the present invention is illustrated in which the reflective layer 24 is positioned on the anterior side of the resin substrate 14. The elements of FIG. 8 which are similarly numbered as those elements in FIG. 1 are equivalent, and a further description of the composition of these elements already described in connection with FIG. 1 will be omitted from the description of the polymer-based mirror 500 of FIG. 8. The core of the polymer-based mirror 500 comprises a resin substrate 14 having tie-bond layers 18 respectively formed on its front surface 12 and its rear surface 16. The posterior surface-hardening layer 22 and back-coat layer 26 would then be respectively formed over the tie-bond layer 18 on the posterior side of the resin substrate 14. Prior to forming the reflective layer 24 on the anterior side of the resin substrate, a layer of SiO material 502 between 500 to 1200 angstroms, preferably 750 angstrom, is formed over the tie-bond layer 18. The reflective layer 24 is then formed over the SiO layer 502. An anterior surface-hardening layer 504 is then formed to coat the reflective layer, where the anterior surface-hardening layer 504 has the same composition as posterior surface hardening layer 22. The weather-resistant coating 402 is then formed over the anterior surface-hardening layer 504. In this embodiment of the polymer-based mirror 500, the reflective surface of the mirror 500 is located on the anterior side of the resin substrate 14 so that light is reflected from the mirror without actually passing through the resin substrate 14. However, the polymer-based mirror may still be subjected to the same warpage and distortion problems from moisture as the other embodiments of the present invention. Thus, each of the various layers of polymer-based mirror 500 are also selected to have a moisture permeability providing the anterior surface 12 of the resin substrate 14 with substantially the same exposure to moisture as the posterior surface 16.

While it is understood that polymer-based mirror of the present invention may be formed in any number of ways known to shape thermoplastic or thermoset resin objects, the resin substrate 14 in the various embodiments of the polymer-based mirror of the present invention is preferably formed using an improved injection/compression molding technique. Once the resin substrate 14 has been formed using this technique, it is removed from the mold where the various coatings of the present invention are then applied to form the polymer-based mirror. The injection/compression molding process of the preferred invention consists of enjoining a compression action within an injection mold (not shown) with the activity of a conventional injection molding process. The injection/compression molding process can be described as a cyclical process which encompasses the following steps: heating and melting of a thermoplastic resin material; mixing and homogenizing the now liquid material (the melt); injecting the melted thermoplastic material into the mold cavity; initiating the injection/compression cycle of the present invention; cooling and curing or solidifying the melted thermoplastic resin in the mold cavity, and ejecting the finished resin substrate 14 from the mold. The injection/compression molding process requires that the thermoplastic material undergo two phase changes during the cycle. The solid thermoplastic resin is first heated to form a viscous liquid melt for injection into the mold after which the melt is converted back into a solid state by cooling in the mold under secondary compression.

In selecting PMMA as the preferred optical grade material for the present invention, it is understood that all plastics are governed by the thermodynamic principles which are basic to the chemical structure of each. In the melting of various thermoplastics, the quantity of heat required per unit weight may vary significantly depending on the differences in heat capacity of the various thermoplastics. This characteristic also defines the control the process and mold design have over molecular orientation in the processing of plastic mirrors.

The present invention overcomes the problems of poor mold surface replication and residual part stresses by the molded thermoplastic article, and more specifically to maximize micro-replication of the finest surface detail and figure onto an optical grade thermoplastic injection molded product such as a plastic mirror. Such fidelity of the injection molded part to the molding surfaces is achieved by dynamically moving, under hydraulic pressure, the surfaces of the mold toward one another during a particular phase of the injection cycle. As the injection portion of the molding cycle is underway, at a predetermined point of change over from a first stage of injection, the pre-determined, volumetrically metered filling of the mold cavity is stopped and the injection cycle goes into a second stage holding time phase. Synchronous with the point of first stage to second stage cycle phase change over, the mold starts to compress the contents of its cavity simultaneously with cessation of the injection of thermoplastic material. Prior to the thermoplastic material temperature declining below its glass transition temperature, the mold has compressed the cavity contents to a pre-adjusted position. Uniform compression is exerted over the entire surface of the resin substrate 14. As a result of the uniform compression, all stresses are distributed uniformly over the entire area of the parts surface, significantly negating stress induced birefringence. Furthermore, the process also creates a processing environment that renders uniformity to part-to-part density thus controlling the parts optical clarity and weight.

The injection/compression technique of the present invention incorporates unique characteristics that differ considerably from that of conventional injection mold techniques. While conventional injection mold techniques utilize stationary molds the use of injection packing pressures to complete the fill cycle of the thermoplastic material injection process, the present invention incorporates dynamic components that allow for the reduction of injection pressures during the molding process while integrating exceptional control over the part volume and the ability to molecularly replicate the resin substrate surfaces. In another preferred embodiment of the present invention, an annealing procedure may be added to the formation of the polymer-based mirror 10 to further enhance its compliance with weatherability requirements for both interior and exterior vehicular applications. The annealing process is done to release internal stress within the synthetic resin substrate 14. The annealing process consists of heating the polymer-based mirror 10 (in an oven for example) to about 130° to 150° F. for about 5–6 hours. The piece is then cooled slowly to room temperature, 70° F., and must at least be cooled to 110° F. In performing the annealing process, forced-air circulation ovens designed for the annealing and heating of synthetic polymers are recommended. Good forced air circulation ensures uniform temperatures essential to the annealing process. The oven's air velocity should be between 150–250 feet per minute and should be controllable to within +/−10° F. (+/−6° C.) to avoid uneven or excessive heating. Temperature control selection effects oven performance. Controllers monitoring oven temperature and maintaining constant voltage into the heating elements are considered to work best, but conventional controllers can be used, such as percentage timer controls which regulate the percent of time heaters are on, but may not provide the best uniform heat the better controllers offer for this process. Proportional time controls with step switches to vary heat output have shown to produce uneven temperatures when evaluated under this process.

Before the annealing process begins, the polymer-based mirror must be clean and dry. Spray masking, protective tape, paper masking, and other material must be removed to prevent it from baking onto the material. Plastic masking may remain in place. To anneal synthetic polymers, heat to 180° F. (80° C.), just below the deflection temperature, and cool slowly. Heat one hour per millimeter of thickness. For thin sheet, a minimum of two hours has been found to be preferable. While cooling times are generally shorter than heating times, thermal stresses may occur if cooled too quickly. A minimum cooling time of two hours should be used.

Experiments showed that for thicknesses above 8 mm, the hours required to cool equal the thickness in millimeters divided by four. It is important that the items are not removed until the oven temperature falls below 140° F. (60° C.). Removing the mirror too soon can offset annealing's positive effects. It is important to ensure that the mirror is adequately supported during annealing. Raised sections may need independent support to prevent sagging. Lack of proper support can also inhibit relaxation.

| Thickness (in.) | Heating Time (min.) | Cooling Time (hours) | Cooling Time (hours) | (° F./hr.) |
| --- | --- | --- | --- | --- |
| .080 | 2.0 | 2 | 2 | 28 |
| .098 | 2.5 | 2 | 2 | 28 |
| .118 | 3.0 | 3 | 2 | 28 |

The character of the mirror substrate 14 can be further enhanced through the application of light path and reflectivity enhancing organic or inorganic coatings or additives. Such coatings or additives may be applied through a variety of methods, such as but not limited to dipping, spraying, vacuum deposition and/or compounding into the synthetic substrate. Such coatings and/or additives may be utilized to enhance the weatherability of the mirror assembly through the application of anti-abrasion and antireflective surface coatings and/or through the addition of Hindered Amine Light Stabilizers (HALS), Antioxidants, Quenchers, and Ultraviolet absorbers or inhibitors to the substrate material.

The synthetic substrate 14 further may be UV (ultraviolet) stabilized with a UV inhibitor or UV absorber in order to prevent color or synthetic substrate degradation over time as well as enhancing the light energy absorbing characteristics of the synthetic substrate. UV absorbers work by absorbing ultraviolet radiation and converting it into thermal energy through tautomerism. To counteract the damaging effect of UV light and improve the weatherability of the synthetic substrate 14, UV stabilizers may be used to solve the degradation problems associated with exposure to sunlight. UV stabilizers can be categorized by two general classifications for an ultraviolet light absorber (UV A), either benzopheneone or benzotriazole based systems. The preferred substrate 14 additives for the present invention being the type based on benzotriazole and hindered amine light stabilizers (HALS). Typical UV inhibitors or stabilizers which may be utilized in the present invention are: Cyagard® 1164L, Cyagard® 3638, Cyagard® UV 531, Cyagard®UV 5411, Cyagard® UV 9, Cyasorb® 1084, Cyasorb® 1164, Cyasorb® 284, Cyasorb®UV 1988, Cyasorb® UV 2098, Cyasorb®UV 2126, Cyasorb®UV 24, Cyasorb®UV 2908, Eastman Inhibitor RMB, Givsorb® UV-1, Givsorb® UV-2, Givsorb® UV-13, Givsorb® UV-14, Givsorb® UV-15, Givsorb® UV-16, Mark 1535, Mark 446, Maxgard® 200, Maxgard® 800, Norbloc® 6000, Norbloc® 7966, Quercetin, Sanduvor® 3206, Sanduvor® EPU, Sanduvor® VSU, Seesorb 201, Syntase 1200, THPE BZT, Tinuvin® 99, Tinuvin® 109, Tinuvin® 1130, Tinuvin® 120, Tinuvin® 1545, Tinuvin® 1577FF, Tinuvin® 320, Tinuvin® 326, Tinuvin® 327, Tinuvi 328, Tinuvin® 384, Tinuvin® 400, Tinuvin® 571, Tinuvin® 840, Tinuvin® 900, Tinuvin 928, Tinuvin® P, Uvinul® 3035, Uvinul® 3039, Uvinul® 3048, Uvinul® 400, Uvinul® D 49, Uvinul® D 50, Uvinul® P 25, Uvinul® T-150.

The addition of UV absorbers alone to a substrate often have limited effectiveness because their performance is a function of Beer's (Lambert) law, which specifies that the amount of UV radiation absorbed is a function of both sample thickness and stabilizer concentration. This means that UV absorbers need to be used in high concentrations and require relatively long path lengths in order to absorb enough UV light to be effective. Thus, the protection of the substrate 14 of the present invention is enhanced with a HALS (Hindered Amine Light Stabilizer), where the present invention preferably utilizes a combination of CIBA Chemicals Tinuvin® P and Tinuvin® 770 to provide the aforementioned UV light stabilization.

HALS are extremely efficient stabilizers against light-induced degradation of most polymers. They do not absorb UV radiation, but act to inhibit degradation of the polymer. Significant levels of stabilization are achieved at relatively low concentrations. HALS' high efficiency and longevity are due to a cyclic process wherein the HALS are regenerated rather than consumed during the stabilization process. HALS additives found to perform well with the UV inhibitor/absorber constituents chosen for the present invention are: CHIMASSORB® 119FL, CHIMASSORB® 2020, CHIMASSORB® 944, TINUVIN® 123, TINUVIN® 123S, TINUVIN® 622, TINUVIN® 765, TINUVIN® 770, TINUVIN® 783, AND TINUVIN® 791, all manufactured by CIBA Specialty Chemicals, Inc. The preferred HALS additive, TINUVIN 770 is a low molecular weight hindered amine light stabilizer that provides excellent stability for thick section synthetic polymer substrates. The range of the TINUVIN 770 additive concentration used in the present invention is from approximately 0.1% to 0.5% by weight, with a preferred amount of approximately 0.2%.

It is further possible to add a certain amount of dyes or tint color to the substrate 14 in order to enhance the optical performance of the mirror without reducing its reflectance below the acceptable standards of the international automotive industries. Several tints have been found to increase the contrast ratio of the image viewed through or from the mirror of the present invention, where these tints fall primarily in the spectrum range of 320 to 700 nm wavelengths. The tint colors being blue, red, green and yellow. Although the red, green and yellow tints helped to reduce the glare of the present invention, the rate of reduction was most dramatic through the introduction of a blue tint. The tints added to the substrate were generally found to only absorb about ⅓ of the visible light spectrum, while allowing the residual ⅔ to be reflected back.

In the automotive industry, the glare from light reflected back from automotive mirrors to a viewer is commonly known as the dazzle effect. This dazzle effect results from the reflected blue light, and not the remaining green, yellow, red and infrared light rays. Infrared light is for the most part removed by the water particles found in Earth's lower atmosphere. With the exception of blue light, the other colors have long wavelengths which pass through the atmosphere without being scattered and diffused. Conversely, the short wavelength blue light is diffused very rapidly. These blue light rays are then chaotically bounced around by water particles in the upper strata and lower down, continue to be thrown in all directions by any reflective surface on the ground so as to radiate in any and all directions. As these blue light rays enter the eye, they result in a haze effect, thus bleaching out the other colors and creating the effect known as glare. The tendency of blue light to scatter creates the effect of competing with all the other colors of the spectrum, thus causing the image that forms on the retina at the back of the eye to suffer from a certain amount of "bleaching" or glare.

Blue light is a higher energy light. By reducing or filtering it through absorption, we first allow all the remaining colors of the spectrum to show through more clearly and vividly as the blue light is no longer there to dominate. Secondly, the visual acuity (sharpness of vision) is enhanced by reducing the bleaching effect which causes the outline of objects to be hazed and indistinct. And, thirdly, there is a quantum improvement in the individuals' comfort by way reduced light sensitivity.

The preferred blue tint additive for the substrate 14 for both cosmetic and light absorption reasons was found to be NIBIOLA Ultra Marine Blue, a sodium aluminum sulfosilicate. The typical chemical analysis of a medium Ultra Marine Blue gives us: SiO2 . . . 37%, Al2O3 . . . 28%, S . . . 14%, and Na2O . . . 19%. The NIBIOLA Ultra Marine Blue chemical formula can be expressed as: $Na_{6.88}(Al_{5.65}Si_{6.35})O_{24}S_{4.24}$. While the best results were observed from the use of NIBIOLA Ultra Marine Blue, it is understood that other blue tint additives could similarly be utilized. For example, the following blue tint additives were found to be compatible with the synthetic polymer base material comprising the substrate 14 of the present invention: heliogen pigments made by BASF, which are phthalocyanines, KRONOS 2073, Ti-Pure R-103 by Dupont, Tronox Chloride 470 and 435 as well as Tronox Sulfate R-KB-2 and CR-840. These blue tint additives performed well in reducing glare and dazzle in the reflective image from the mirror of the present invention. It is the full intention of the inventor of the present invention not to limit the tint additives to the above-described blue tint additives, where it is understood that any color tint additive could be utilized without departing from the teachings of the present invention.

The synthetic resin substrate 14 making up the base of the mirror of the present invention is a polymer, where most polymers are manufactured by processes involving chain polymerization, polyaddition, or polycondensation reactions. These processes are generally controlled to produce individual polymer molecules with the following defined variables: molecular weight (or molecular weight distribution), degree of branching, and composition. Once the initial product of these processes is exposed to further shear stress, heat, light, air, water, radiation or mechanical loading, chemical reactions start in the polymer which have the net result of changing the chemical composition and the molecular weight of the polymer.

These reactions, in turn, lead to a change in the physical and optical properties of the polymer. In practice, any change of the polymer properties relative to the initial, desirable properties is called degradation. In this sense, "degradation" is a generic term for any number of reactions which are possible in a polymer. The important aspect of this scheme is that once oxidation starts, which it always will, it sets off a circular chain reaction which accelerates degradation unless stabilizers are used to interrupt the oxidation cycle. Exposure to sunlight and some artificial lights can have adverse effects on the useful life of plastic products. UV radiation can break down the chemical bonds in a polymer. This process is called photo degradation and ultimately causes cracking, chalking, color changes and the loss of physical properties.

For the present invention to possess such image clarifying characteristics is was required to overcome several obstacles associated with synthetic polymers in general. By combining the aforementioned constituency of ultraviolet absorbers, antioxidants, quenchers, and hindered amine light stabilizers and compatible tint chromospheres, the polymer mirror of the present invention has been able to maintain the transmissivity and stability of the mirror device as well as to maintain its compatibility with the aforementioned coatings.

It has been found that the combined use of a HALS component clearly improves the performance of a PMMA substrate's resistance to environmental degradation and the UV inhibitor additive augments the resistance to chemical bond breakdown. While any combination of a HALS component and a UV inhibitor could be utilized with the present invention, the preferred combination has been found to be that of Tinuvin® P with Tinuvin® 770 to provide the desired UV light stabilization.

The performance of the synthetic resin substrate 14 of the present invention was tested using variances of the aforementioned additives. The additives addressed were HALS, antioxidants, thermal stabilizers, and UV absorbers. These tests evaluated stabilizer performance and the effect of combined enhancement additives on overall performance of the substrate 14. The preferred combination of tints and resins were compared with a wide range of individual stabilizers. It has been found that lifetime effects of single stabilizers ranged from 0.03 to 6.1 times the lifetime of unaltered, unstabilized synthetic substrates for the various resins of the present invention that were tested. The known top performing single stabilizers were combined to optimize the UV and antioxidation stabilization concentrations and combinations of each of the single UV stabilizers and anti-oxidants. Each of the single UV stabilizers and anti-oxidants loadings were varied in the synthetic resin raw materials used to manufacture the substrate 14 test plaques. The stability of each test plaque variant was observed. The process was repeated as necessary to optimize the relationship between the individual additive components.

The tint additive, UV absorber, and anti-oxidant concentrations were held constant, while concentrations of HALS and thermal stabilizers were optimized at different quencher concentrations. All other processing variables were held to within a processing window of plus or minus 5% by weight of the best recommended process window as derived from proprietary molding test protocols. In the present invention, it was observed that as the quencher light stabilizers were varied, the concentrations of HALS and thermal stabilizers required to achieve the maximum substrate service life also changed.

The results of the combined optimizations within the described new invention greatly expands the expected lifetime of the present inventions synthetic polymer based mirror substrates when compared to substrates not treated with the preferred additives described herein. In an evaluation of the stability of the described preferred tint additive, Ultramarine blue dye from NIBIOLA, the preferred tint of the present invention, lasted three times longer with accompanying additives than normal untreated synthetic substrates. The blue tint additive, KRONOS 2073 lasted more than 2.5 times longer in the substrate 14 of present invention with accompanying additives than normal untreated synthetic substrates. For example, the visual observations shown in the following chart illustrate that, after 24 hours, ULTRAMARINE Blue dye from NIBIOLA exhibited the following matrix interaction effects and reflectivity.

| Resin | Reflectivity | Color | Stability (2000 Hrs) Accelerated Testing |
|---|---|---|---|
| PMMA (Acrylic) | 72% | Cobalt Blue | Excellent |
| Polycarbonate | 56% | Intense Royal Blue | Good |
| CR-39 | 70% | Dark Blue | Excellent |

The present invention solves the difficult task of stabilizing synthetic resins having optical characteristics from the effects of weathering and ultra-violet radiation. The required stabilization is complicated by the multiple interactive effects observed between the available stabilizers, tint dyes, and synthetic resins. However, the additives to the resin substrate 14 of the present invention have been found to extend the expected lifetime of the substrate 14 over that of non-stabilized synthetic resins by a factor of 20.

As can be seen from the foregoing, a polymer-based mirror formed in accordance with the present invention provides a lightweight and durable synthetic resin mirror that is resistant to mechanical distortion resulting from moisture absorption. Further, the polymer-based mirror of the present invention possesses increased weatherability and durability by providing a more weather resistant barrier to water infusion.

An alternative embodiment of the present invention provides at least equivalent or better performance characteristics to a polymer substrate coated with dry layers of zirconia and silicon dioxide by creating a gradient coating of a zirconia/silica colloid in a polysiloxane liquid carrier through a sol gel coating step that not only provides an appropriate sealing of a synthetic substrate but also provides an anti-abrasive coating and the ability to inherently create a hydrophobic surface with a high concentration of zirconia/silica. The resulting coating can further be processed to provide a hydrophilic coating depending upon a desired application.

Figure 9:
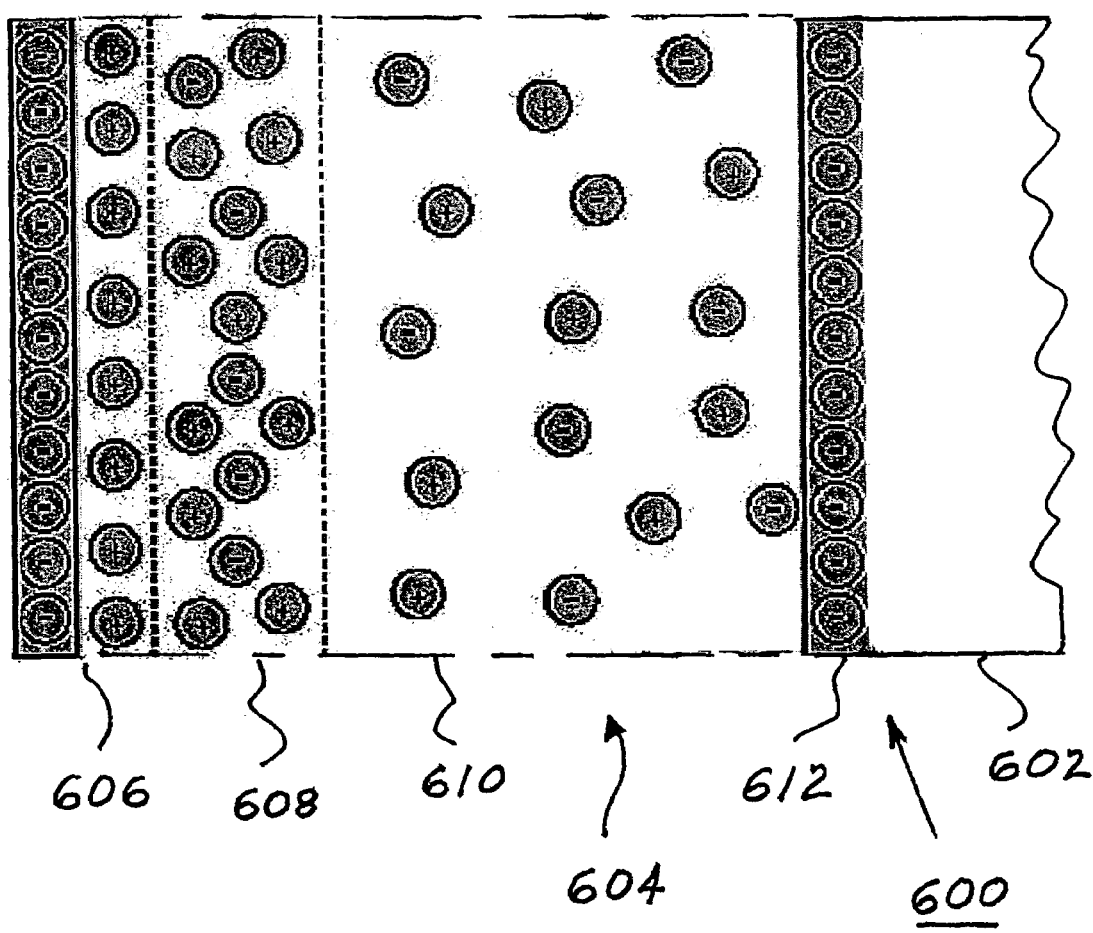
FIG. 9 is a partial schematic cross-sectional view of still another preferred embodiment of a coated resin substrate component with abrasion resistant properties.

As can be appreciated, FIG. 9 is a schematic view for purposes of illustration only to assist in understanding the features of the present invention.

Referring to FIG. 9, a schematic cross-sectional view of the resulting sol gel layer on a synthetic substrate is disclosed. As will be subsequently described, by an appropriate preparation of a sol gel solution, it is possible to create a layered configuration of various concentrations of zirconia/silica colloid particles with a preferred exterior surface of primarily a zirconia/silica containing coating composition while dispensing with the necessity of separate deposition production steps in creating the multiple layers that may be required in other embodiments.

As mentioned above, a synthetic resin substrate with appropriate optical clarity such as polymethyl methacrylate (PMMA) resin can be used, although other similar polymers are also applicable such as described with regards to the embodiment shown in FIG. 1. The synthetic resin substrate 602 can be appropriately formed into a desired shape and can include appropriate tints, ultraviolet absorbers, light stabilizers and other inhibiters, depending on the particular desired end use of the product.

The synthetic substrate 602 which is only shown in partial view, with only one surface illustrating schematically the coating arrangement, can be appropriately prepared or cleaned depending on the specific synthetic resin, before its submersion into a prepared sol gel solution. The resulting sol gel coating or layer 604 is shown schematically broken into roughly three separate zones or layers. The first exterior layer 606 represents an approximately 75% concentration of a zirconia/silica colloid concentration within the polysiloxane carrier. The next zone or layer 608 comprises approximately a 10% zirconia/silica colloid concentration, while the remaining zone or layer 610 adjacent to the surface of the synthetic substrate 602 has a dispersed layering of a final approximately 15% of zirconia/silica colloid suspension in the polysiloxane carrier. The thickness of the accumulative respective layers 606, 608 and 610 can usually be 10 microns and below, such as between 3 and 6 microns although other ranges of thickness are possible depending on the specific end product 600. As can be appreciated, the sol-gel coating can cover all or just one surface of the substrate depending on the manner of application and the desired end product.

In the schematic shown in FIG. 9, there is a ZETA potential influenced interspersed elements of an anodic and cathodic zirconia/silica colloid. Initially, the final resulting coating 604 will be hydrophobic, with an abrasion or scratch-resistant exterior surface having a high concentration of zirconia/silica colloid without requiring an additional coating step. Likewise, the surface of the synthetic substrate 602 will have a chemabsorbed cathodic element layer 612 of zirconia/silica that provides an equivalent tie bond coating without requiring an extra coating step in the production procedure. The representative circles with negative charges in FIG. 9 indicate cathodic zirconia/silica colloid particles while the plus circles indicate anodic zirconia/silica colloid particles.

The amount of concentration of zirconia/silica colloid particles with the same potential in the specific layers or zones can be controlled by regulating post-applied conditions after the sol gel coating has been deposited on the synthetic substrate 602. Initially, the entire layer 604 as applied will have a homogenous dispersion of the charged zirconia/silica colloid particles. Subsequently, the particles will migrate and orientate as they are drawn to the surface and will continue to do so until they reach a balance state in the uncured sol gel coating. As can be appreciated by persons of ordinary skill in this field, the amount of solid zirconia/silica colloid precursor added to the polysiloxane liquid carrier will have an effect on the balanced or gradient state of concentration of the zirconia/silica particles. Additionally, depending upon the design characteristics of the end product, it is possible to intentionally cure the sol gel layer before the zirconia/silica colloid particles have completely migrated and orientated to a final balanced position. Such curing can be done thermally while respecting the glass transition temperature of the underlying substrate. Other curing procedures are possible such as but not limited to the inclusion of UV activators in the polysiloxane liquid carrier that when treated with ultraviolet light, will assist in a cross-linking of the polysiloxane.

The sol gel coating of the present invention can be applied by most conventional methods of applying liquid coatings, i.e., spray, dip, spin, flow or even vapor deposition coating techniques. One of the preferred application methods for a vehicle window or mirror is the use of a dip coating method to provide a high degree of control over the resulting thickness of the coating by controlling the rate of removal of the substrate from a tank of the sol gel solution with the sol gel coating in a liquid state so that a desired thickness is achieved by virtue of the surface tension and attraction between the substrate and the sol gel coating. This pre-form product is then placed in a stationary or a static position in an environmentally controlled enclosure for a desired period of time. For example, with a thickness in the range of 3 to 6 microns, for an optical product for use in the auto industry, the time period can be between 3 to 10 minutes with 6 minutes being preferred. This holding period, however, may change depending upon the part geometry and the particular end use and design purpose of the product. Generally, the enclosed environment should be at a normal ambient temperature at a 50% to 70% humidity. This holding period allows the ZETA potential of the colloid suspension to orientate itself and also allows the excess moisture and volatile organic compounds to escape from the sol gel coating prior to undergoing cure.

While the exact scientific understanding for achieving the desired finished product is not necessary, if the method teachings of the present invention are followed, it is believed that the following explanation may be applicable.

It is known that Van Der Waals force is constant at a given separation distance between particles and is strongest at the equilibrium separation distance in the dispersed state. Colloidal particles usually absorb ions to the surface. This primary absorption layer gives rise to a substantial surface charge or electrical potential to the surface that may facilitate the interspersing or layering of the zirconia/silica. First it causes a repulsion to exist between two particles when they approach each other preventing the nanoparticles from sticking together. And, secondly, attracts counter ions into the vicinity of the nanoparticle giving the layered construction of the suspension.

The electrostatic force may be varied from zero to a high value by surface potential control. In the present invention, both pH and magnetic attraction could be used to manipulate the density and overlap of the zirconia/silica precursor. By altering the ionic strength by way of exposing the dispersion to altered pH and ZETA potential, the linear relationship between nanoparticles can be adjusted or the potentials and densities over layered. The exposure of the sol-gel to atmosphere exposes it to anionic potential and draws a significant amount of the zirconia precursor to this surface and while the substrate offers a lesser amount of anionic charge, it does facilitate the adhesive qualities of the coating to the synthetics substrate.

The sol-gel colloid solution for forming the sol gel layer 604 is preferably formed according to a multi-step process. Three examples of coating formulas A, B and C are set forth and each formula is designed to prevent any premature coagulation or gelling of the constituents of the sol gel layer 604 due to uncontrolled thermal reactivity. The use of well defined precursors allows relationships to be established between the precursor and the final coating material. The formation of the sol gel involves the evolution of inorganic networks through the formation of a colloidal suspension (sol) and gelation of the sol to form a network in a continuous liquid phase (gel). The precursors for synthesizing these colloids consist of a metal or metalloid element surrounded by various reactive ligands. The metal alkoxides react readily with pure water. The metal alkoxides used in the present invention are alkoxysilanes, such as tetramethoxysilane (TMOS). However, other alkoxides such as aluminates, titanates, and borates are also commonly used in the sol-gel formation process, often mixed with tetraethoxysilane (TEOS).

The sol-gel colloid solution for coating the substrate 602 includes the preparation of basically three stages, a hydrolysis, an alcohol condensation and water condensation stage. Within the context of these stages, many factors affect the resulting silica network,—such as pH, temperature and time of reaction, reagent concentrations, catalyst nature and concentration, H2O/Si molar ratio (R), aging temperature and time. However, the characteristics and properties of the present sol-gel inorganic network are related to a number of factors that affect the rate of hydrolysis and condensation reactions, such as pH, temperature and time of reaction, reagent concentrations, catalyst nature and concentration, H2O/Si molar ratio (R), aging temperature and time, and drying. Of the factors listed above, pH, nature and concentration of catalyst H2O/Si molar ratio (R), and temperature can be controlled to vary the structure and properties of the sol-gel-derived inorganic network over a wide range.

The actual sol-gel polymerization occurs in three stages:
1. Polymerization of monomers to form particles
2. Growth of particles
3. Linking of particles into chains, then networks that extend throughout the liquid medium, thickening into a gel.

Formula A

Formula A
Preparation procedure:
Si(OC2H5) TEOS Molecular Weight: 208.33
$SiO_2$ Molecular Weight: 60.09
Zr(poropyloxide)$_4$, TPT Molecular Weight: 284.26 $ZrO_2$ Molecular Weight: 79.9 Silicone tetraethoxide is partially hydrolyzed with water Formula A is the preferred formulation and is formed by combining a solution A (a partial hydrolysis of TEOS) with a solution B (a zirconia precursor). Solution A is formed by combining a mixture of 186.6 grams of Si (OET)$_4$, 53.8 grams of $SiO_2$, and 322.4 grams of 95% ethanol (including 5% water: 16.1 gram). To this mixture, 0.3 grams of concentrated HCl, having a solid content of 12.5%, are dropped. The mixture is then reflux at the boiling point of ethanol for 2 hours to consume all of the water in the ethanol solvent. A check of the rate of evaporation should be used to verify full consumption of the water content. The solution is then cooled to room temperature, and Solution A is thus formed having a solid content of approximately 12.5%.

Solution B is the $ZrO_2$ precursor and is formed by initially adding 33.7 gram of TPT (triphenyltin) and $ZrO_2$ 9.5 grams with IPA. ETOH is then added very slowly to dilute Solution B. Solution B is then slowly added to Solution A. The mixed solution temperature will rise about 2–3 degrees C. After continued stirring and cooling to room temperature, 27.9 grams of 0.1 N HCl aqueous is added into the mixed solution. The solution is then stirred for approximately 30 to 45 minutes to generate Formula A as a $ZrO_2$ doped $SiO_2$ solution.

Formula B

Formula B is prepared by combining two solutions: Solution C (a full hydrolysis of TMOS oligomer in water) and Solution D (a $ZrO_2$ precursor prepared in polar solvent). Solution C is prepared by initially dropping 28.0 grams of 0.1 N HCl aqueous into 100 grams of TMOS Oligomer (having $SiO_2$: 53.06 gram). The solution initially is a phase separation, and it will change into a transparent liquid in about 10 minutes. The temperature should be controlled so that it does not exceed 25 degrees C. At least 225 grams of water is slowly added while stirring the solution to dilute the solution into solid content of 15% to form Solution C.

Solution D is prepared by dissolving 22.2 grams of $ZrO_2$ in 240 ml of DMAC (dimethylammonium acetate) at about 10 degrees C. The solution should be heated slowly during this process. To this solution, 4.2 grain of water is added by drops so as not to raise the temperature of the solution. Solution C is then slowly added into solution D, and the combined solution is heated at 100 degrees C. for not more than 1 hour to fully hydrolyze the $ZrCl_4$. The resultant sol becomes a dichloride by using a cation ion-exchanger to provide a hydrophilic sol solution. When the reflux is complete, an anatase-type $ZrO_2$ solution of Formula B is generated.

Formula C

Formula C is prepared by distilling 400 grams of sodium metasalicate in 40 ml of water. The pH is adjusted to 1 by adding HCL. The resultant mixture is stirred at 22° C. while adding 64 grams of zirconyl chloride to create a reactive sol. The reactive sol is emulsified in 500 ml of ethanol by stirring at 1800 RPH for 10 minutes. Subsequently, 40 grams HMTA (hexamethylenetetramine) and 40 grams of urea are added and the resultant mixture is stirred for approximately 50 hours. The mixture is then cooled, filtered, and washed with ethanol. The resulting solution is then redispersed to form an anatase $ZrO_2$ base of 100%. The anatase $ZrO_2$ sol-gel is transparent.

Each of the formulas A, B and C are mixed or dispersed in a carrier fluid such as a polysiloxane liquid medium that can be conventionally purchased such as Dow Corning's SYL-OFF® series polysiloxane. The zirconia/silica sol-gel can be dispersed in a polysiloxane liquid medium in four different ways: a) in solution form; (b) in sol or micelle form; c) attached to the surface of the inorganic particles, forming a shell or partial shell around the inorganic particles; and d) combinations of a), b), and c). Once the components are mixed together, uniform dispersion of all components can be facilitated, if necessary, by subjecting compositions of the present invention to sonification, utilizing equipment such as VibraCell 700 Watt ultrasonic horn (available from Sonics and Materials), or shear mixing.

Dispersions of several hundred milliliters to several gallons with concentrations of up to 75 weight percent of the respective formulas can be practically prepared by dispensing into a rapidly agitated carrier fluid. The preferred percent of precursor solids is approximately 50 weight percent. Surface wetting and dispersion is best achieved with moderate rate agitation of approximately 800–1200 rpm. Motorized mixers such as the Eppenbach, Colframo, Arde-Barinco, Janke and Kunkel or Lightnin' Mixers with a conventional open-blade impeller (pitched marine or saw tooth propeller) are most appropriate. Extremely high-shear mixers such as Waring blenders or rotor-stator homogenizers should be avoided. The mixing intensity generated by this type of mixer can shear the opened (hydrated) polymers resulting in permanent viscosity loss. Conventional impellers, such as propellers or turbines, do not impart excessively high shear rates. They can be used to mix mucilages for extended periods with virtually no decrease in formula efficiency.

The thickness, crystalline phase, grain size, and surface hydroxyl amount of the sol gel layer 604 are optimized using the above-described manufacturing process. After application of the sol gel, the sol gel is cured to form the sol gel layer 604. The zirconia coated silica sol gel can be cured thermally or through the addition of an ultraviolet sensitive photo-initiator to be included in the formulation in order to start the polymerization reaction, as radiation-cured coatings are typically superior to those of other systems. Photosensitive radiation curing can be accomplished in a short time period, thus making radiation curing a particularly economic technique. The resulting cured sol gel layer 604 is hard and abrasion resistant and further resistant to degradation from chemicals and other external elements.

As shown in FIG. 9, the exterior layer 606 surface is charged to a cathodic response as a result of the method of coating to provide a hydrophobic surface state to repel water. A secondary treatment procedure is available to convert the 606 surface layer to a hydrophilic surface state to attract or wet the surface with water. The optical product 600 can be immersed in a water solution having 20% by weight Sodium Hydroxide (NaOH) at an ambient temperature of 72° F. for 3 to 5 minutes to create a phase change in polarity of the surface from a cathodic response to an anodic response. The resultant optical product is rinsed with pure water and dried.

The sol gel coating method enables a surface coating layer of either a hydrophobic or hydrophilic state without requiring separate deposition steps, therefore saving cost while increasing design options for the end product.

The sol gel coating method of the present embodiment can be advantageously utilized with a large number of different products having a synthetic substrate. For example, plastic resin windows and plastic resin mirrors can be utilized in the automobile industry. Plastic resin substrates of various configurations, however, are also possible wherein the substrate is protected from environmental conditions and is further provided with an abrasion resistant exterior surface. The sol gel method of applying the gradient coating layer to such a synthetic resin substrate is particularly economical in lowering the production cost of such parts.

Figure 10:
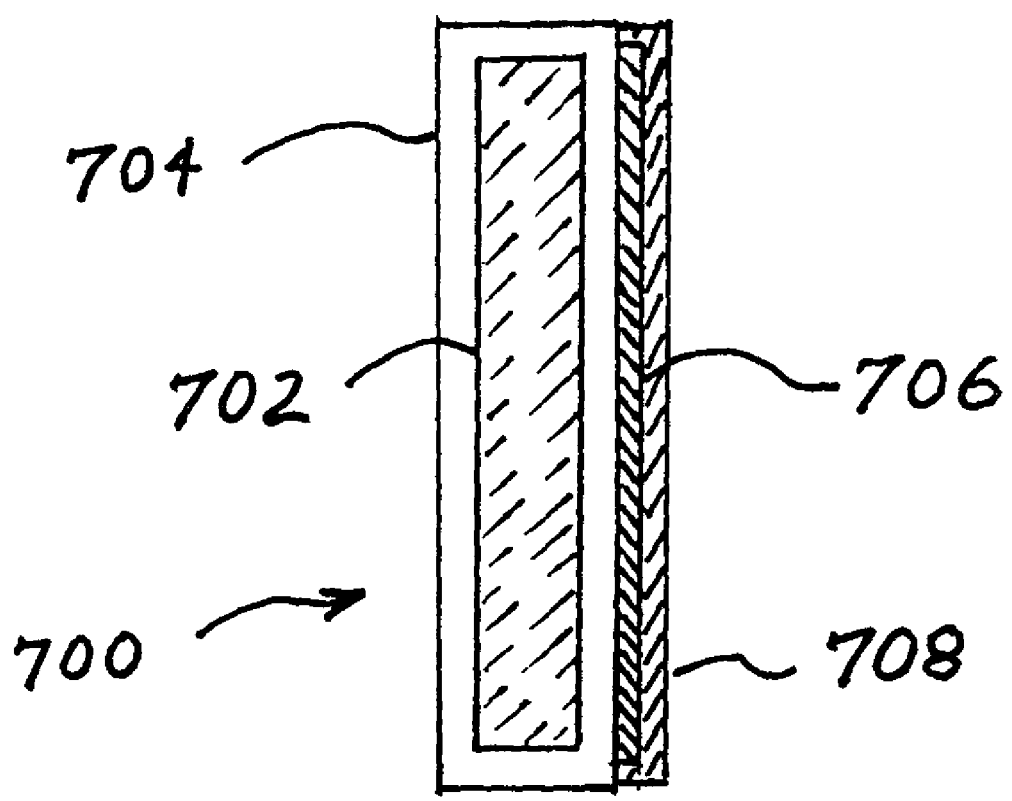
FIG. 10 is a schematic cross-sectional view of a polymer based mirror.

Referring to FIGS. 9 and 10, one example of a sol gel coated optical product can be a polymer-based mirror 700 having a synthetic resin substrate 702 encapsulated with a multilayered gradient coating of polysiloxane with a variable concentration of zirconia/silica colloid particles in each layer. The surface will have a tie-bond concentration of cathodic chemabsorbed zirconia/silica. An exterior surface as shown in FIG. 9, will have a high concentration of zirconia/silica colloid particles to provide a highly abrasion resistant surface. On the rear surface of the substrate 702, a reflective coating 706 or multi-layered coatings can be deposited as previously described in the other embodiments. Finally, a barrier coating or paint 708 can also be applied to seal the reflective layer 706. As should be appreciated, FIG. 10 represents only a schematic view and is not drawn to proportion relative to the size of the substrate 702 and the respective coating, reflective and barrier layers.

Figure 11:
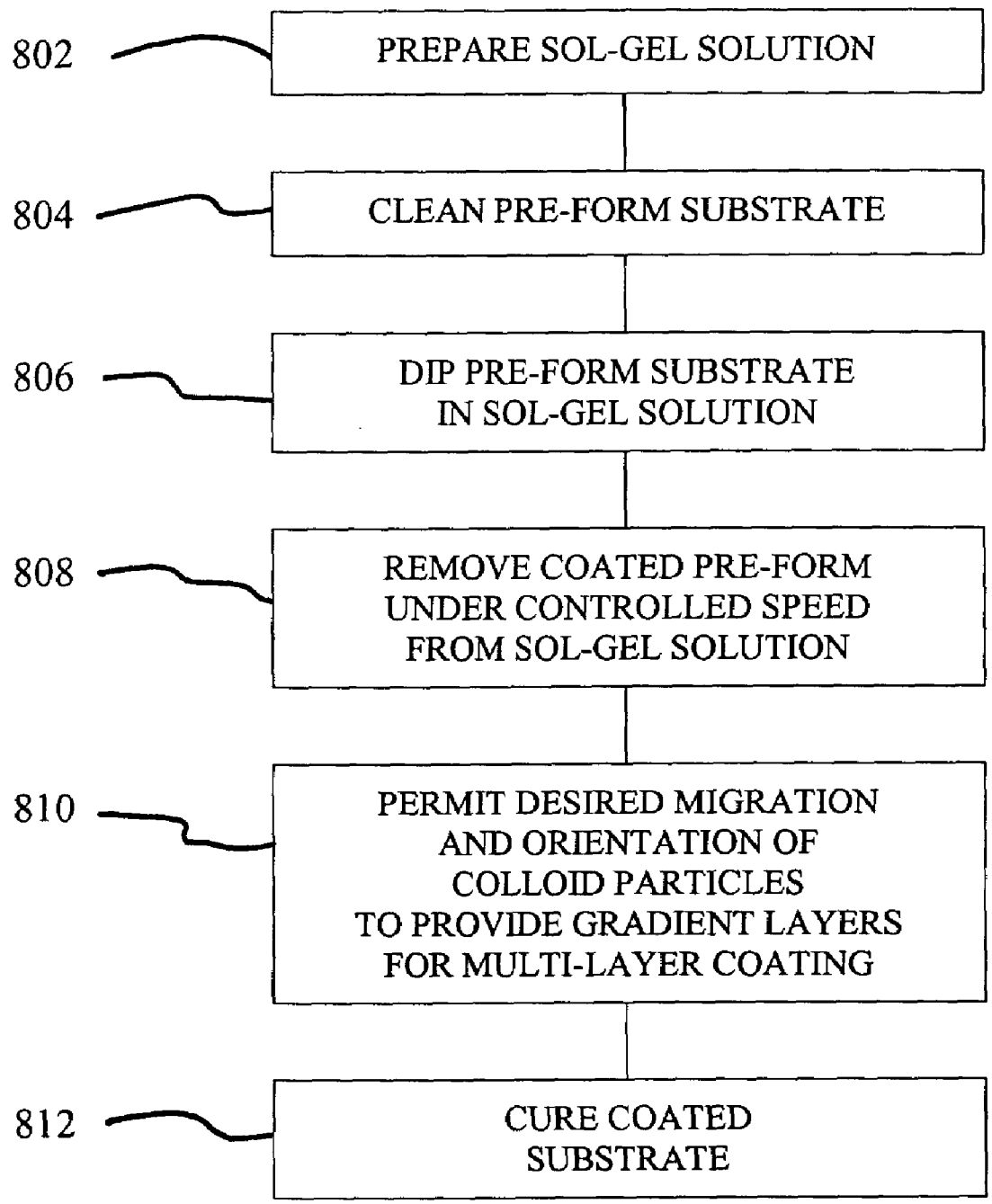
FIG. 11 is a flow chart of production steps to create a pre-form product.

To create a pre-form or sol coated substrate for the mirror of FIG. 10, the following production steps are utilized. Referring to FIG. 11, a sol-gel solution as described herein is prepared. A resin substrate of a desired geometry and configuration is appropriately cleaned with water, solvent or other material appropriate to the particular resin in step 804. The preformed substrate is appropriately mounted and then dipped into the sol-gel solution in step 806. The coated pre-form is then removed under a controlled speed from the tank of sol-gel solution so that an appropriate thickness is provided on the substrate in step 808. The coated substrate is then placed into a controlled environment to permit the desired migration and orientation of colloid particles as water and solvents are evaporated to produce the desired gradient layers to the coating in step 810. Finally, the coated substrate is appropriately cured in step 812.

Subsequently, the reflective coating and the barrier coating can be added.

In each of the above embodiments, the different structures of the polymer-based mirror are described separately in each of the embodiments. However, it is the full intention of the inventor of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A plastic component, comprising:
   a transparent synthetic resin substrate having an anterior surface and a posterior surface;
   a tie-bond layer formed on said anterior surface and said posterior surface of said synthetic resin substrate; and
   a multi-layer surface abrasion resistant coating on the tie-bond layer, the multi-layer surface abrasion resistant coating and tie-bond layer are formed by a single wet coating that is cured to provide at least two layers of the surface abrasion resistant coating having respective different concentrations of colloid particles.

2. The plastic component of claim 1 wherein metal oxide colloid particles are in the single wet coating to form the multi-layer abrasion resistant coating and the tie-bond layer.

3. The plastic component of claim 2, wherein the multi-layer surface abrasion resistant coating has varying amounts of $Z_v(iPv)_2$ and $SiO_2$ from said anterior substrate surface to an exterior surface of the multi-layer surface abrasion resistant coating.

4. The plastic component of claim 1, wherein the two layers provided in the surface abrasion resistant coating include a first layer on an exterior surface having a colloid particle concentration of approximately 75% by weight.

5. The plastic component of claim 4, wherein a second layer adjacent the first layer has approximately 10% by weight colloid particle concentration.

6. The plastic component of claim 5, wherein the tie-bond layer has approximately 15% by weight colloid particle concentration.

7. The plastic component of claim 6, wherein the tie-bond layer is a cathodic chemabsorbed colloid particle concentration formed in the single wet coating of a sol gel.

8. The plastic component of claim 7 further has a reflective coating.

9. The plastic component of claim 2, wherein the multi-layer surface abrasion resistant coating has an exterior surface of cathodic colloid particles to provide a hydrophobic coating.

10. The plastic component of claim 2, wherein the multi-layer surface abrasion resistant coating has an exterior surface of anodic colloid particles to provide a hydrophilic coating.

11. The plastic component of claim 2, wherein the multi-layer surface abrasion resistant coating has an exterior surface that is enabled to be one of hydrophobic and hydrophilic depending on an applied pH level to the exterior surface.

12. A plastic component comprising:
    a transparent synthetic resin substrate having an anterior surface and a posterior surface;
    a tie-bond layer formed on one of said anterior surface and said posterior surface of said synthetic resin substrate; and
    a transparent multi-layer surface abrasion resistant coating on the tie-bond layer, the multi-layer surface abrasion resistant coating and tie-bond layer are formed by a single wet coating that is cured to provide at least two layers of the surface abrasion resistant coating having respective different concentrations of colloid particles including a first layer, on an exterior surface, containing a majority of the colloid particles by weight.

13. The plastic component of claim 12 wherein metal oxide colloid particles and an organosilicon polymer are in the single wet coating to form the multi-layer abrasion resistant coating and the tie-bond layer with the metal oxide colloid particles being approximately 50% by weight of the single wet coating and the transparent synthetic resin substrate includes one of a polymethyl methacrylate resin and a polycarbonate resin.

14. The plastic component of claim 13, wherein the multi-layer surface abrasion resistant coating has varying amounts of $Z_v(iPv)_2$ and $SiO_2$ from said anterior substrate surface to the exterior surface of the multi-layer surface abrasion resistant coating.

15. The plastic component of claim 13, wherein the two layers provided in the surface abrasion resistant coating include the first layer on the exterior surface having a colloid particle concentration of approximately 75% by weight.

16. The plastic component of claim 15, wherein a second layer adjacent the first layer has approximately 10% by weight colloid particle concentration.

17. The plastic component of claim 16, wherein the tie-bond layer has approximately 15% by weight colloid particle concentration.

18. The plastic component of claim 17, wherein the tie-bond layer is a cathodic chemabsorbed colloid particle concentration formed in the single wet coating of a sol gel.

19. The plastic component of claim 18 further has a reflective coating.

20. The plastic component of claim 13, wherein the multi-layer surface abrasion resistant coating has an exterior surface of cathodic colloid particles to provide a hydrophobic coating.

21. The plastic component of claim 13, wherein the multi-layer surface abrasion resistant coating has an exterior surface of anodic colloid particles to provide a hydrophilic coating.

22. The plastic component of claim 13, wherein the multi-layer surface abrasion resistant coating has an exterior surface that is enabled to be one of hydrophobic and hydrophilic depending on an applied pH level to the exterior surface.

23. The plastic component of claim 12, wherein the two layers provided in the multi-layer surface resistant coating includes the first layer having a zirconia/silica colloid particle concentration of approximately 75% by weight, and a second layer adjacent the first layer having a zirconia/silica colloid particle concentration of approximately 10% by weight and the tie-bond layer formed on the synthetic resin substrate having a zirconia/silica colloid particle concentration of approximately 15% by weight.

24. The plastic component of claim 23, wherein a reflective coating is provided on the other of said anterior surface and said posterior surface of said synthetic resin substrate to provide a mirror.

25. The plastic component of claim 23, wherein one of a hydrophobic and hydrophilic surface is provided on the surface of the first layer.

26. The plastic component of claim 23, wherein a cathodic chemabsorbed zirconia/silica layer is formed between the tie-bond layer and surface of the synthetic resin substrate.

* * * * *

UNITED STATES PATENT AND TRADEMARK OFFICE
CERTIFICATE OF CORRECTION

| | | |
|---|---|---|
| PATENT NO. | : 7,018,057 B2 | Page 1 of 1 |
| APPLICATION NO. | : 10/633972 | |
| DATED | : March 28, 2006 | |
| INVENTOR(S) | : David A. Richard | |

It is certified that error appears in the above-identified patent and that said Letters Patent is hereby corrected as shown below:

<u>Title page,</u>
Item [75], Inventor, "Shingles" should be deleted and insert -- Shingle Springs --.

Signed and Sealed this

Twenty-seventh Day of June, 2006

JON W. DUDAS
*Director of the United States Patent and Trademark Office*